W. H. Main.
Anti-Friction Roller.
Nº 17,333.  Patented May 19, 1857.
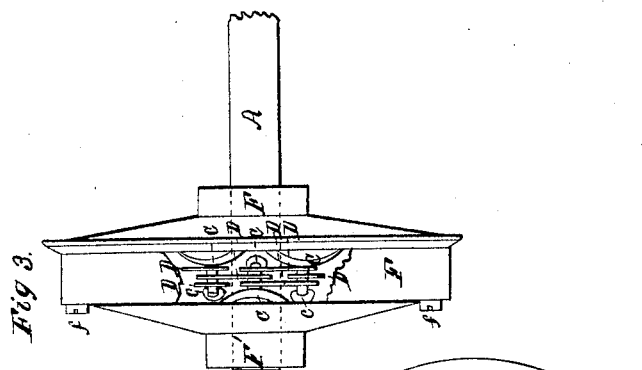
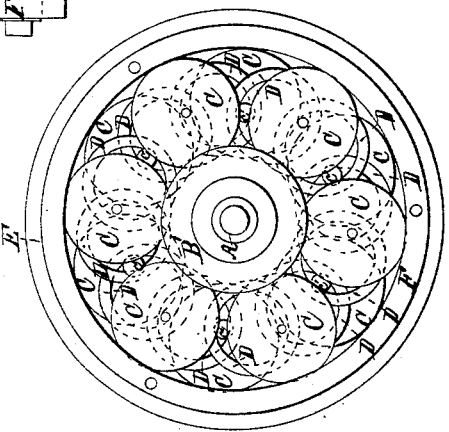
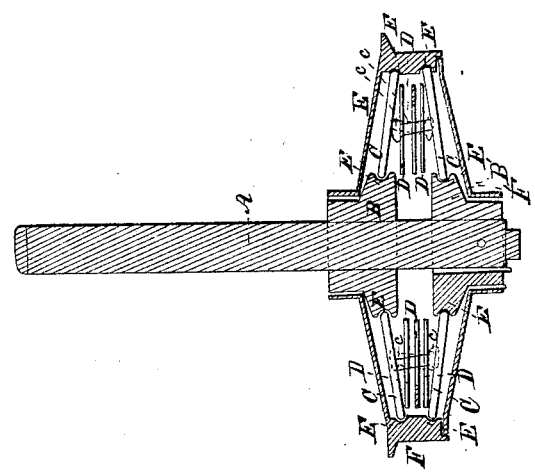

UNITED STATES PATENT OFFICE.

WM. H. MAIN, OF LITCHFIELD, OHIO.

FRICTION-ROLLER FOR JOURNALS OF SHAFTS, AXLES, &c.

Specification of Letters Patent No. 17,333, dated May 19, 1857.

*To all whom it may concern:*

Be it known that I, WM. H. MAIN, of Litchfield, county of Medina, and State of Ohio, have invented a new and useful Arrangement in Friction Wheels or Rollers, and that I do hereby declare that the following is a full and exact description thereof, reference being had to the accompanying drawings and to the letters of reference marked thereon.

The nature of my invention consists in providing the journal of a shaft " or axle " with two series of friction wheels (or rollers) each standing at an angle of about ten or fifteen degrees with the line of the journal, and having their outer edges supported by the interior of a box or wheels and providing the inner periphery of said box or wheel with grooves in which the outer edges of said wheels (or rollers) travel, also providing the shaft on which the friction wheels are to act, with two flanges each of said flanges having a groove on their outer periphery which form tracks for the inner edges of said friction wheels to travel in. One of said flanges is fastened permanently to the shaft and the other is provided and secured to the shaft with a pin or setscrew, so that said flanges may be brought nearer together, by which means the angle of the friction wheels becomes less obtuse and consequently tightens the journal around which the friction wheels run. The friction wheels are kept at equal distances by means of their journals passing through a series of rings forming an endless chain, each ring having a rotary motion independent of the motion of the whole chain, which rotary motion is given to said rings, by the inner periphery of the rings coming in contact with the journal of the friction wheel thus causing the whole to move without friction, the rings being placed between the friction wheels.

Figure 1, represents a horizontal section, showing the inclined friction wheels in their position also the adjustable flanges. Fig. 2, represents a vertical view with the cover removed. Fig. 3, represents the car wheels with a piece of the rim broken away to show the position of the rings that form the chain. Fig. 4, represents one of the friction wheels in section. Fig. 5 represents one of the rings in section.

Letters (A) is a shaft on which is keyed the flanges (B), the flange (B′) being secured with a pin or key so as to be set up closer to flange (B) for the purpose of tightening the friction wheels (C, C, C, C,) as shown in (Fig. 1).

D, D, D, D, Figs. 1, 2 and 3, are round rings that are held together by means of the journals of the friction wheels passing through them, as shown in Fig. 3, at C′, C′, C′. The chain being formed in this way keeps the friction wheels at their proper distances when they are in operation.

E, E, E, E, are grooves turned out (or cast in) the flanges B, and B′, also in the inner periphery of the car wheels (or box) for the friction wheels C, C, C, C, to run in.

F is the case of a car-wheel having one of its sides made to be removed with facility to enable any one to attend to the friction wheels, the movable side being shown at F′, F′, (Figs. 1 and 3).

*f, f,* are the screws for securing the movable head.

H, Fig. 4, is a flange on the end of the journal of the friction wheels to keep the rings D from getting off from their place.

Having fully described my invention, what I claim as my invention and desire to secure by Letters Patent is—

Arranging the two series of friction wheels at any suitable angle with the line of the journal so that when they, the said wheels are placed in a suitable box or wheels the journal of said shaft may be supported and braced in all directions. The friction wheels having their journals supported by a series of embracing rings which thus form their rolling bearings in the manner herein described.

WILLIAM H. MAIN.

Witnesses:
GEO. F. HUTCHINGS,
LUCY ANN HUTCHINGS.